J. P. CLIFFORD.
SCALE OR WEIGHING DEVICE.
APPLICATION FILED FEB. 12, 1915.

1,175,604.

Patented Mar. 14, 1916.
3 SHEETS—SHEET 1.

WITNESSES:
L. Hauerstein
A. L. Kitchin

INVENTOR
John P. Clifford
BY Munn & Co.
ATTORNEYS

J. P. CLIFFORD.
SCALE OR WEIGHING DEVICE.
APPLICATION FILED FEB. 12, 1915.

1,175,604.

Patented Mar. 14, 1916.
3 SHEETS—SHEET 2.

WITNESSES:
L. Hauerstein
A. L. Kitchin

INVENTOR
John P. Clifford
BY Munn & Co
ATTORNEYS

J. P. CLIFFORD.
SCALE OR WEIGHING DEVICE.
APPLICATION FILED FEB. 12, 1915.

1,175,604.

Patented Mar. 14, 1916.

WITNESSES
L. Hauerstein
A. L. Kitchin

INVENTOR
John P. Clifford
BY
Munn
ATTORNEYS

UNITED STATES PATENT OFFICE.

JOHN PURSER CLIFFORD, OF PASSAIC, NEW JERSEY.

SCALE OR WEIGHING DEVICE.

1,175,604.  Specification of Letters Patent.  Patented Mar. 14, 1916.

Application filed February 12, 1915. Serial No. 7,754.

*To all whom it may concern:*

Be it known that I, JOHN P. CLIFFORD, a subject of the King of England, and a resident of Passaic, in the county of Passaic and State of New Jersey, have invented a new and Improved Scale or Weighing Device, of which the following is a full, clear, and exact description.

This invention relates to improvements in scales or weighing machines, and has for an object to provide an improved structure for weighing large amounts with exactness.

Another object of the invention is to provide scales for weighing large amounts and indicating the amount of over weight upon each weighing operation so that the exact amount will be recorded.

A further object of the invention is to provide scales adapted to weigh predetermined amounts, and to be actuated when said predetermined amounts have been arranged on the scale, the mechanism being formed so as to show in addition to the predetermined amount any excess which may be placed on the scale.

A still further object of the invention is to provide a scale designed to weigh a predetermined amount but adapted to indicate the correct weight of a less amount, and also the correct weight of a greater amount.

Figure 1:
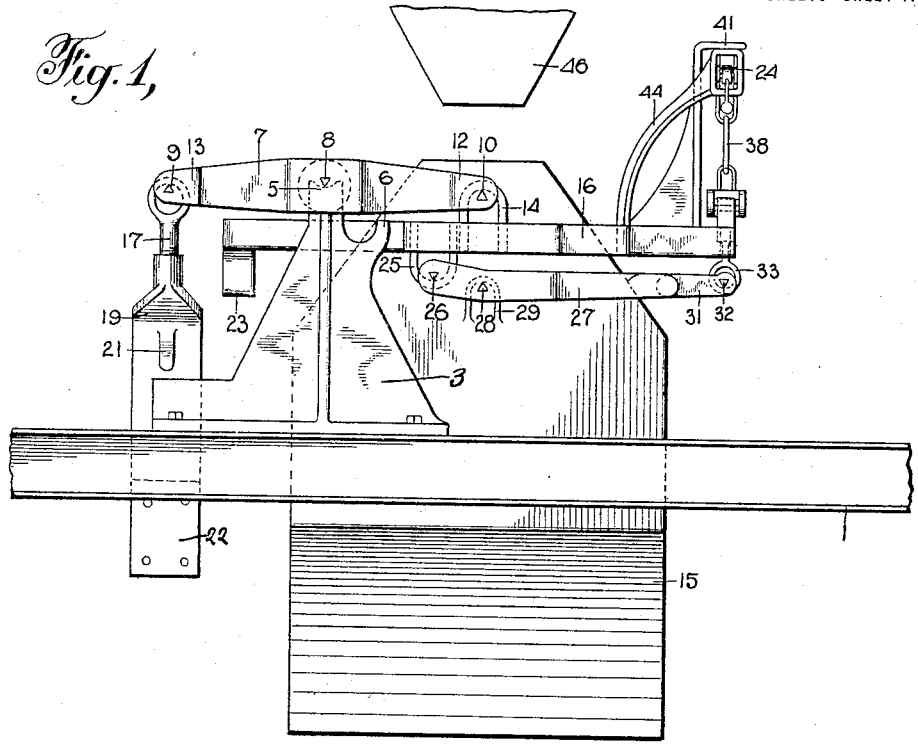
Figure 2:
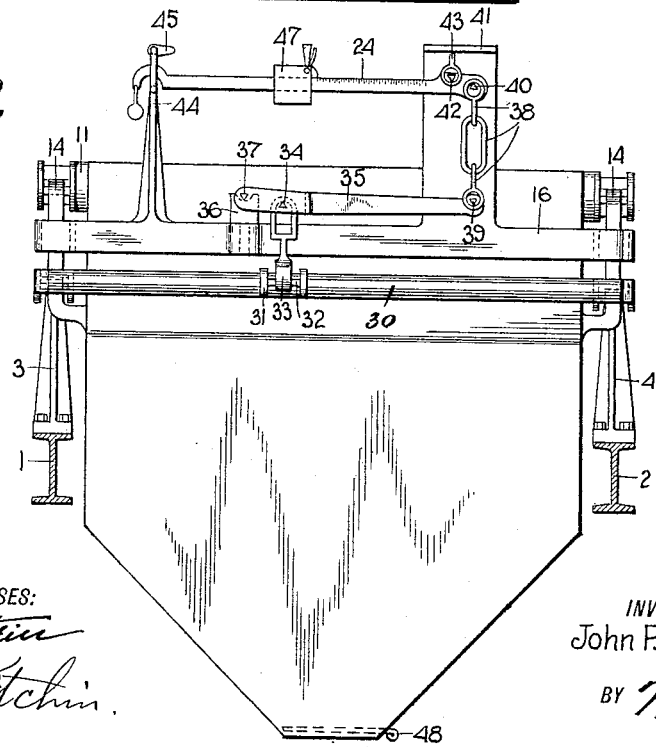
Figure 3:
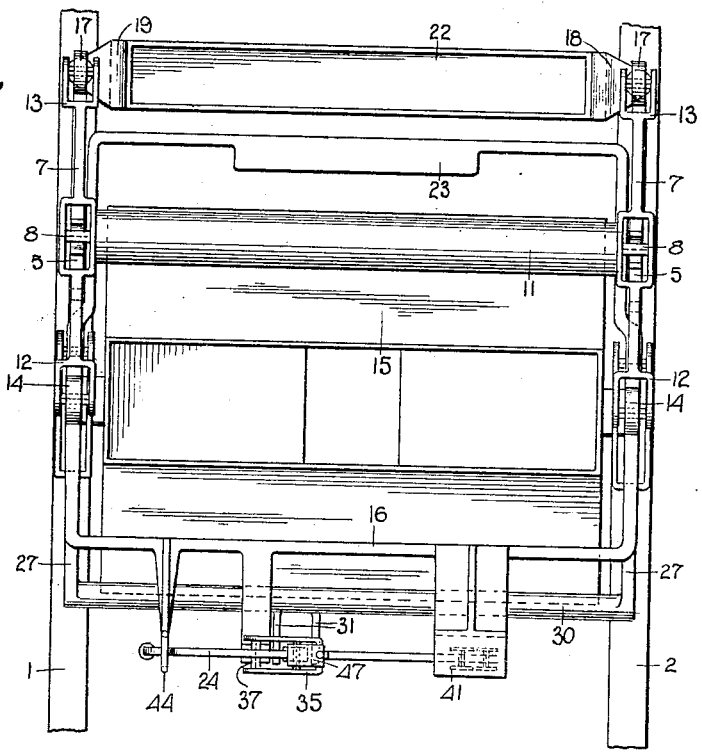
Figure 4:
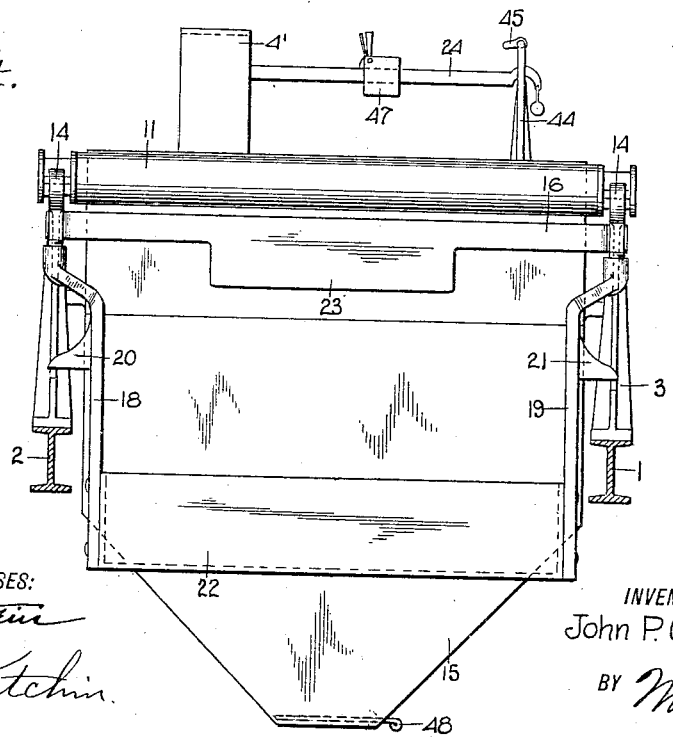
Figure 5:
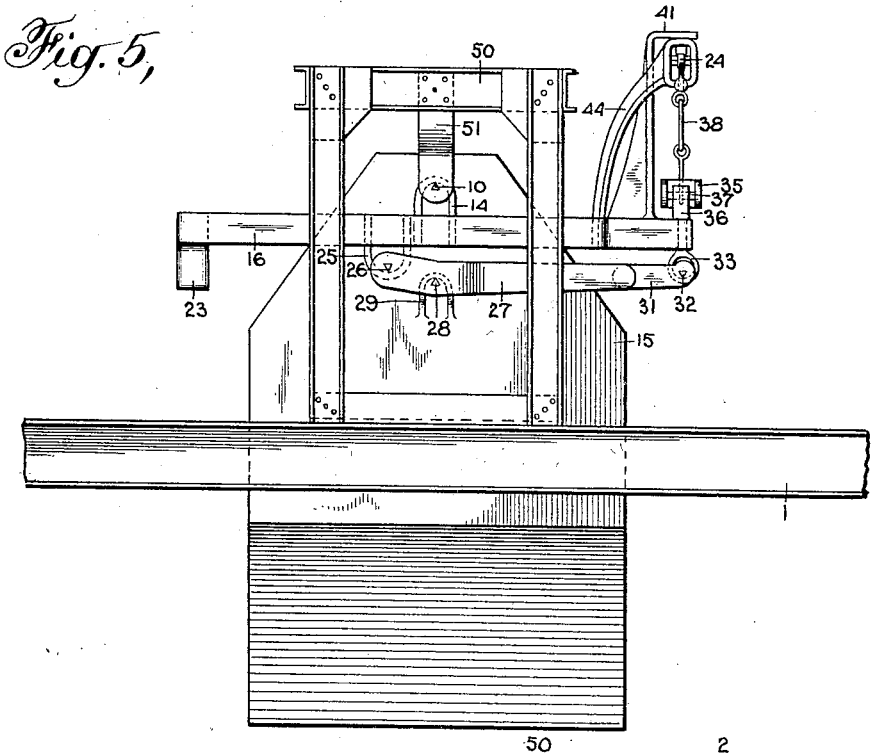
Figure 6:
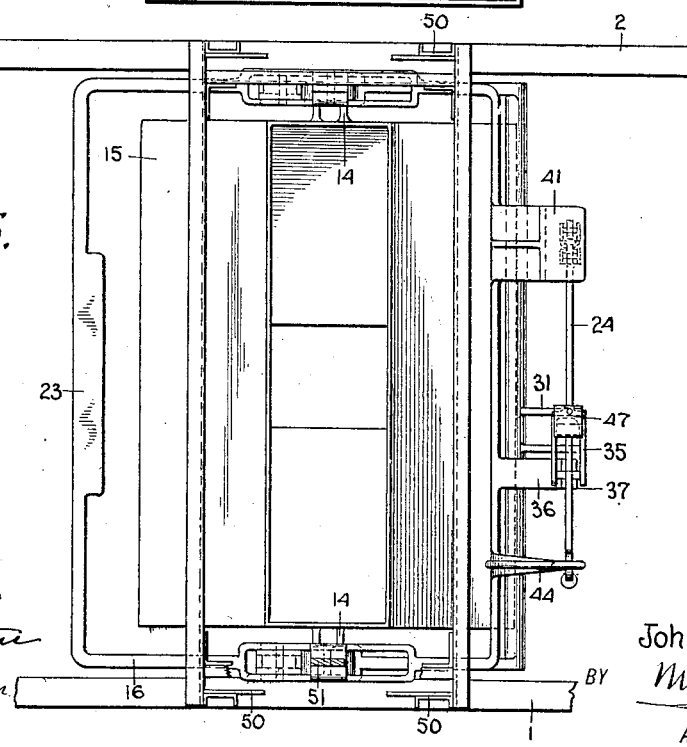

In the accompanying drawings—Figure 1 is a side view of an embodiment of the invention; Fig. 2 is a front view of the scale and associated parts shown in Fig. 1; Fig. 3 is a top plan view of the structure shown in Fig. 2; Fig. 4 is a rear view of the structure shown in Fig. 1; Fig. 5 is a side view of a slightly modified form of the invention to that shown in Fig. 1; and Fig. 6 is a top plan view of the construction shown in Fig. 5.

In scales adapted to weigh large amounts, as for instance two thousand pounds or thereabouts, it has been customary to arrange the scales so that when the proper amount has been inserted the scales will tip in the usual manner and move until it engages a stop so as not to break the mechanism of the scales. Where the matter being inserted or placed on the scales is grain, liquid matter or in fact loose matter of any kind, an excess amount is usually supplied in addition to the predetermined amount, namely, the two thousand pounds above mentioned, before the flow of material can be shut off. This excess amount unless removed manually is not registered on the scale and therefore is lost.

The present invention is intended to provide a scale for weighing any desired quantity, and for showing the excess placed on the scales.

In the accompanying drawings one construction embodying the invention has been disclosed, which structure will accomplish the result just mentioned.

Referring therefore to the accompanying drawings by numerals, 1 and 2 indicate supporting beams of any desired construction which have secured thereto the journal members or supporting brackets 3 and 4. It will be evident that other supporting means may be provided besides members 1 and 2 without in any way departing from the spirit of the invention. The upper ends of the brackets 3 and 4 are provided with a bearing member 5 for receiving a knife journal and a lug or extension 6 acting as a stop. Pivotally mounted on each of the brackets 3 and 4 is a lever 7 provided between its ends with a knife journal 8, and at the ends with knife journals 9 and 10. The levers 7 are connected by a cross beam 11, and act together. The front end of each of the levers is provided with a bifurcated portion 12, and the rear end of each of the levers is provided with a bifurcated portion 13. Bifurcated portions 12 straddle the brackets 14 arranged on opposite sides of the receptacle 15 and are rigidly secured to the frame 16. The brackets 14 may be secured in any desired manner, as for instance by being passed through part of the frame 16 and riveted in position. The bifurcations 13 at the rear of the lever 7 support the journals 9 on which are mounted the supporting links 17 (Figs. 1 and 3). The supporting links 17 are connected with upstanding brackets 18 and 19 (Fig. 4), the connection being in any desired way, as for instance by the links 17 being threaded into the upper part of the brackets 18 and 19. The brackets 18 and 19 are provided with stops 20 and 21, respectively, so as to engage extensions arranged on the brackets 3 and 4 and thereby limit the downward movement of the brackets 18 and 19 and associated parts. The brackets 18 and 19 have connected therewith a container or receptacle 22 which may be formed in any desired manner, and is intended to receive weights of any kind, and any amount within the limits of the scale. If it is desired to weigh, for instance, five hundred pounds, one or more weights could be placed in the receptacle 22 aggregating five hundred pounds. If it is desired that the scale should weigh a large amount, as for instance three thousand pounds, weights aggregating that amount would be placed in the receptacle 22.

The brackets 14 are pivotally mounted on the journal member 10 and support frame 16, which frame is provided with a counterbalance 23 for properly balancing the frame 16 and associated parts. The frame 16 is substantially rectangular as shown in Fig. 3 and surrounds the upper part of the container or receptacle 15. Depending brackets 25 are provided on the frame 16, one being arranged on each side of the container 15. These brackets co-act with journal members 26 arranged on the end of the levers 27, said levers also carrying journal members 28 fitting into suitable brackets 29 on the receptacle or container 15. The levers 27 are connected together at the front by a suitable cross bar 30 which preferably is made integral with the levers 27. Extending from the cross bar or beam 30 are lugs 31 (Fig. 2) to which is rigidly secured a bearing 32. Co-acting with bearing 32 is a link 33 having one end surrounding bearing 32 and the other end surrounding a bearing 34 secured to lever 35, lever 35 being journaled on a bracket 36 through journal member 37 and connected with links 38 by a bearing member 39 at the opposite end of lever 35 to bearing member 37. The links 38 connect lever 35 with the scale beam 24, link 38 being engaged by a bearing member 40 arranged on the beam 24. Beam 24 is pivotally mounted on a suitable bracket 41 through a bearing 42 and a suitable supporting looped member 43. The outer end of the beam 24 is guided in its movement by a suitable bracket 44, and is locked against movement whenever desired by a lock 45.

In operation when it is desired to weigh certain quantities of any material, as for instance a number of two thousand pound quantities, weights of any desired material are placed in the container 22, the same weighing exactly two thousand pounds. This will cause the mechanism to be operated until the lugs 20 and 21 have engaged the brackets 3 and 4. The weight 47 is at this time or at some other convenient time moved over to its correct place on the scale beam, as for instance to the point indicating two thousand pounds so that the scale beam will be tipped simultaneously with the movement of the container 15. The brackets will then support the weights until the material to be weighed has been placed in the container or receptacle 15.

This device is especially adapted for weighing grain and other loose material which usually is fed into the container by some form of chute, as for instance the hopper or chute 46. When two thousand pounds of the material has been deposited in the container 15, the same will overbalance the weights in the receptacle 22 and cause the levers 7 to move until they are in engagement with stop 6. As soon as the receptacle 15 begins to move downwardly the material from chute or hopper 46 is turned off, but usually there is an appreciable amount over the recorded weight deposited as the hopper 15 does not begin to move until the full two thousand pounds has been placed therein. In order that the excess may be ascertained the weight 47 (Fig. 2) is moved along the scale beam 24 to the desired point for causing a proper balance of the beam. This will indicate the full amount and also the excess. The material in the receptacle 15 may be dumped in any desired manner, as for instance by opening the gate or door 48. A second amount is then supplied and the operation is repeated. By the provision of the beam 24 and the various parts associated therewith the excess may be ascertained each time that a given quantity is deposited in the receptacle 15. If a greater or less amount is to be weighed at one time the weight in the container is increased by the addition of more weights or decreased by the removal of certain of the weights placed in the container. Preferably, the weights in the container 22 are formed from iron or metal of some kind, and in certain sizes, as for instance one hundred pound sizes so that they may be increased and decreased at will. Fractions of these amounts may also be provided in order to weigh any amount desired.

In Figs. 5 and 6 will be seen a slightly modified form of the invention in which all of the parts are supported by a pair of suitable brackets 50. This form of the invention may be termed a self alining weighing machine, the frame 16 hanging directly upon the depending bars 51 so that the entire weighing movement is confined to the scale beam 24. It will be understood that the same reference numerals will be used in Figs. 5 and 6 as in the preferred form except for the modified structure. The brackets 50 are supported by any suitable support whereby the use of weigths and a receptacle 22 therefore is not necessary. If two thousand pounds, for instance, was to be weighed upon the scale shown in Figs. 5 and 6, the weight 47 would be moved to the indication on beam 24 representing two thousand pounds. The material would then be inserted in the container 15 and as soon as two thousand pounds was placed in the container the downward pressure thereof on the levers 27 would cause a downward movement of the connecting members or links 38, whereupon beam 24 would be raised in the usual manner of scale beams. If more than the specified two thousand pounds was placed in the container weight 47 would be moved along the scale beam 24 until said beam balanced, whereupon the entire weight would be indicated. The floating beam 16 is counterbalanced in a similar manner to the preferred form so that the same will remain normally horizontal. It will thus be noted that scale beam 7 is eliminated from this form of the invention and the entire construction simplified while retaining the advantage of weighing large amounts quickly and indicating either excess or shortage in the amounts weighed.

What I claim is—

1. A scale comprising a pair of supports, a frame pivotally mounted on said supports, a pair of receptacle supporting levers pivotally mounted on said frame, said receptacle supporting levers being adapted to support the matter to be weighed, and weighing means including a scale beam for indicating the exact weight of the matter in said receptacle.

2. A scale comprising a receptacle, a pair of levers pivotally connected to said receptacle, a floating frame pivotally connected with one end of said levers, means for pivotally supporting said floating frame, a pivotally mounted scale beam arranged on said floating frame, a sliding weight arranged on said scale beam, and means for connecting said levers with the short end of said scale beam.

3. A scale comprising a pivotally mounted frame, a counterbalancing lever pivotally mounted on said frame, a receptacle, means for pivotally connecting said receptacle with said lever, a scale beam pivotally mounted on said frame and connected with said counterbalancing lever for indicating any movement of said lever, and a weight for counterbalancing the frame and said receptacle.

4. In a scale of the class described, a receptacle acting as a scale platform, a pair of levers pivotally connected to said receptacle, means connecting the outer ends of said levers, a floating frame, means pivotally connecting the inner ends of said levers to said floating frame, a pivotally mounted scale beam arranged on said floating frame, means connecting the outer ends of said levers to one end of said beam, a weight slidingly arranged on said beam for counterbalancing the same and indicating the amount of weight placed on said beam, a pair of supports for said floating frame, and means for pivotally connecting said frame to said supports.

5. In a scale of the class described, a pair of supports, a floating frame pivotally connected to said supports, a set of levers pivotally connected to said frame, means for pivotally mounting a receptacle on said levers, a pivotally mounted scale beam arranged on said frame, means for connecting the outer ends of said levers to one end of said scale beam, and a movable weight arranged on said scale beam, said movable weight and said scale beam disclosing the weight in said receptacle.

6. A scale comprising a stationary support, a frame pivotally connected with said stationary support, a container for receiving the matter to be weighed, a pair of levers pivotally mounted on said frame, and pivotally connected with said container for supporting the container, a pivotally mounted scale beam arranged on said frame, a sliding weight on said scale beam, and connecting means for connecting said pivotally mounted levers with said scale beam for raising the scale beam against the action of said sliding weight when the weight in said container is a predetermined amount.

7. A scale comprising a pair of supporting brackets, each of said brackets having a pivotal member, a floating frame having a pair of brackets adapted to rest on said pivotal members whereby said frame is pivotally supported thereby, a substantially U-shaped lever pivotally connected with said frame, a container pivotally connected to said lever near the pivotal mounting of the lever, a scale beam mounted on said floating frame adjacent one edge, means for connecting said U-shaped lever with said scale beam for upsetting the same when the weight is placed in said container, and a sliding weight arranged on said beam for indicating the amount of weight in the container.

In testimony whereof I have signed my name to this specification in the presence of two subscribing witnesses.

JOHN PURSER CLIFFORD.

Witnesses:
GEORGE H. FREEMAN,
GEORGE E. ALLEN.

Copies of this patent may be obtained for five cents each, by addressing the "Commissioner of Patents, Washington, D. C."